(12) United States Patent
Shigenobu

(10) Patent No.: US 6,832,276 B2
(45) Date of Patent: Dec. 14, 2004

(54) RECEIVING A RESET SIGNAL DIRECTLY FROM AN ATA OR ATAPI BUS OF A HOST COMPUTER WITHOUT PASSING THROUGH AN INTERFACE PROCESSING UNIT FOR TERMINATION OF A HALF HALTED STATE

(75) Inventor: Masahiro Shigenobu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/312,206

(22) PCT Filed: Apr. 22, 2002

(86) PCT No.: PCT/JP02/03972

§ 371 (c)(1),
(2), (4) Date: Apr. 21, 2003

(87) PCT Pub. No.: WO02/088915

PCT Pub. Date: Nov. 7, 2002

(65) Prior Publication Data

US 2003/0163617 A1 Aug. 28, 2003

(30) Foreign Application Priority Data

Apr. 24, 2001 (JP) ......................................... 2001-125575

(51) Int. Cl.[7] ............................ G06F 13/10; G06F 1/32; G06F 1/24
(52) U.S. Cl. ........................... 710/72; 710/74; 713/320; 713/322; 713/323; 713/324
(58) Field of Search .............................. 710/62, 72, 74; 713/300, 320, 322–324, 310

(56) References Cited

U.S. PATENT DOCUMENTS 5,799,199 A * 8/1998 Ito et al. ...................... 713/324
5,878,264 A * 3/1999 Ebrahim ...................... 713/323

FOREIGN PATENT DOCUMENTS

| EP | 0 929 032 | 7/1999 |
| JP | 11-134078 | 5/1999 |
| JP | 11-198485 | 7/1999 |
| JP | 2000-222077 | 8/2000 |
| JP | 2000-309142 | 11/2000 |
| JP | 2000-353032 | 12/2000 |
| JP | 2001-92565 | 4/2001 |

OTHER PUBLICATIONS

"Oscillation Control Circuit for Power Save", Feb. 01, 1994, IBMTechnical Disclosure Bulletin, vol. 37, issue 2B, pp. 647–648.*

"Automatic Disk Power Reduction for Portable Computers"Sep. 01, 1989, IBMTechnical Disclosure Bulletin, vol. 32, issue 4B, pp. 60–61.*

* cited by examiner

Primary Examiner—Ilwoo Park
(74) Attorney, Agent, or Firm—Frommer Lawrence & Haug LLP; William S. Frommer; Darren M. Simon

(57) ABSTRACT

The present invention relates to an information processing apparatus wherein a device connected to a host computer enters a sleep mode in accordance with a judgment made by the device itself, and the device is restored to its original operating state by a hardware reset signal received from the host computer. To put it in detail, if no data is exchanged through an ATAPI command data I/F for at least a predetermined period of time, a CPU of the device outputs a sleep mode to a clock generator and a drive power supply block to put the device in a sleep mode. When a CPU of the host computer outputs a HRST signal in this mode to the device through an ATAPI bus to restore the device from the sleep mode, an IRQ signal reception unit of the CPU employed in the device receives this HRST signal. Receiving the HRST signal, the CPU of the device issues a command requesting restoration from the sleep mode to the clock generator and the drive power supply block. The present invention can be applied to an optical disc drive.

4 Claims, 4 Drawing Sheets

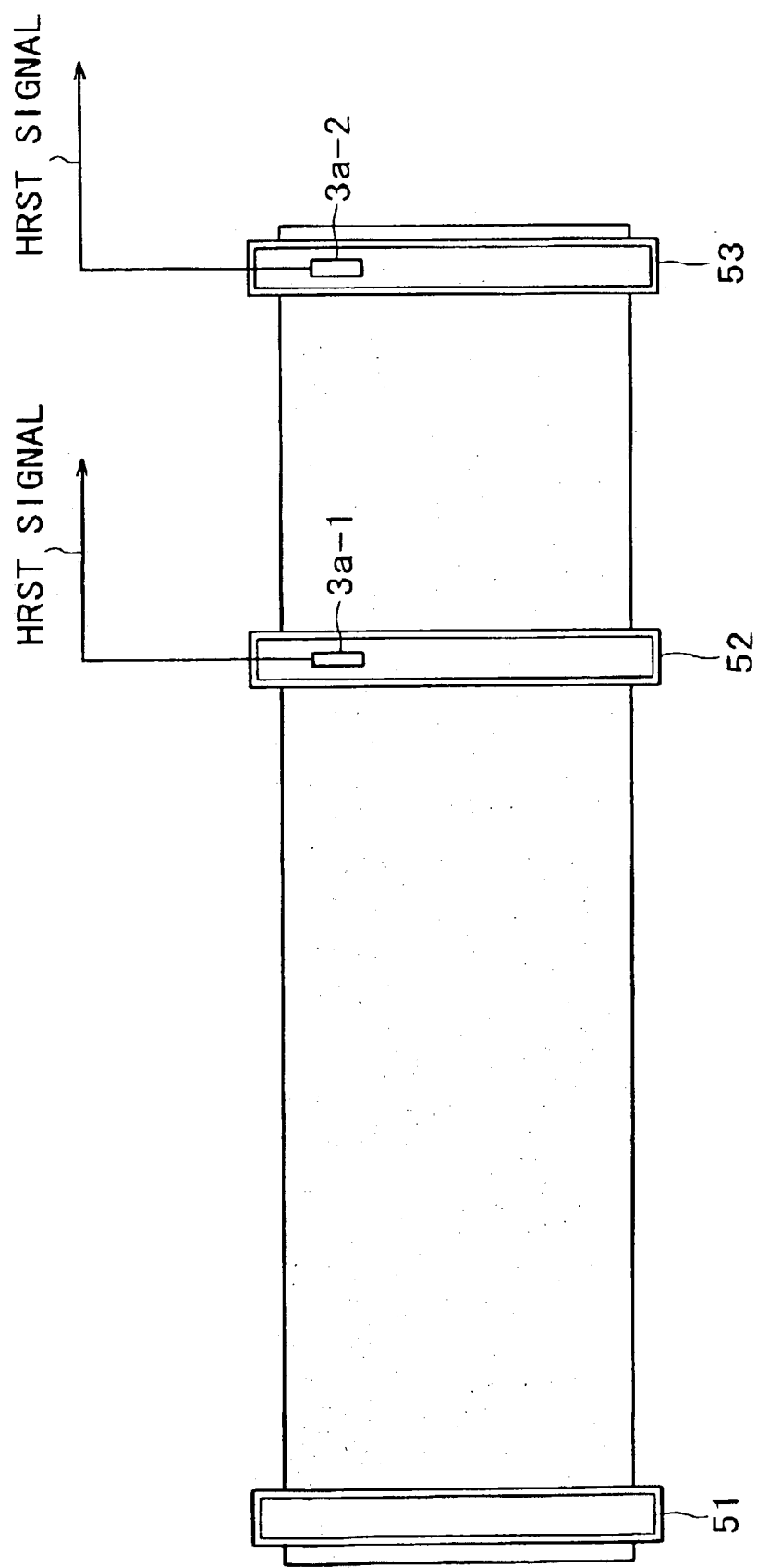

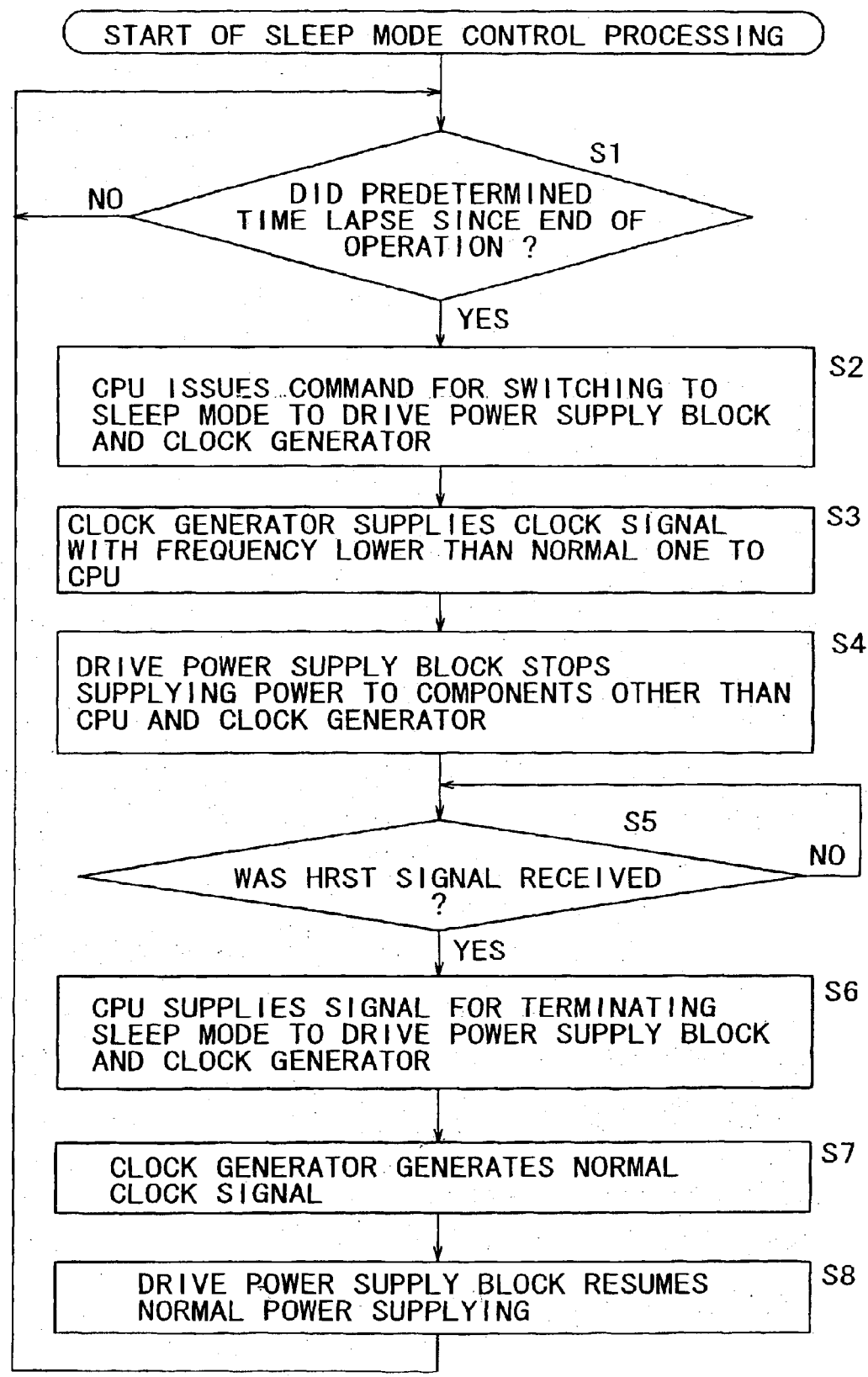

RECEIVING A RESET SIGNAL DIRECTLY FROM AN ATA OR ATAPI BUS OF A HOST COMPUTER WITHOUT PASSING THROUGH AN INTERFACE PROCESSING UNIT FOR TERMINATION OF A HALF HALTED STATE

TECHNICAL FIELD

In general, the present invention relates to an information processing apparatus. More particularly, the present invention relates to an information processing apparatus wherein a device connected to a host computer by an ATA (AT Attachment) bus or by an ATAPI (ATA Packet Interface) bus controls its operating state to a sleep (half halted) state in accordance with a judgment made by the device itself, and the device is restored to its original operating state by a hardware reset signal received from the host computer.

BACKGROUND ART

A technology for putting an inform processing apparatus connected by an ATA bus or an ATAPI bus in a sleep mode in accordance with the operating state of the information processing apparatus has generally been becoming popular.

ATA is the name of an official standard of the IDE (Integrated Drive Electronics) standardized by the ANSI (American National Standards Institute). Much like the SCSI (Small Computer System Interface) standard, the ATA standard is also extended sequentially into ATA-2 and ATA-3 standards.

The ATAPI is a packet interface that is devised for connecting a device other than a hard disc to an IDE controller. An example of the device other than a hard disc is a CD-ROM. At the present time, there also exists an ATA-4 standard, which is a combination of the ATA standard and the ATAPI.

In addition, in the ATA standard and the ATAPI, there are also a plurality of standards such as those for 40, 44, 68 and 80 signal lines.

In the conventional system, a CPU (Central Processing Unit) employed in a personal computer issues a variety of commands to devices by way of an ATA or ATAPI command data interface to control the operation of the device. Referred to hereafter as a host computer, the personal computer is a host computer mounted on a motherboard. The devices include a CD-ROM (Compact Disc Read Only Memory) drive and a-hard disc drive, which are controlled by the commands issued by the CPU employed in the host computer. The ATA or ATAPI command data interface is referred to hereafter as an ATA/ATAPI command data interface.

Assume that a hard disc drive is employed as the device cited above. In this case, the CPU employed in the host computer changes the operating state to a half halted state called a sleep mode when there is no data exchanged with the hard disc drive for a period of time exceeding a predetermined time. In the sleep mode, the rotation of a motor employed in the device is stopped to reduce power consumption of the device.

In the configuration described above, however, only the power of the motor is reduced, and supplying of power to other control and interface components is continued. Thus, in order to further reduce the power consumption, the supplying of power to the other control and interface components must also be stopped as well. Since the device is controlled by the CPU employed in the host computer, however, it is necessary to stop the supplying of power to the ATA/ATAPI command data interface of the device and the supplying of power to a clock generator for supplying a clock signal to the ATA/ATAPI command data interface in order to further reduce the power consumption. If the supplying of power to the ATA/ATAPI command data interface of the device and the supplying of power to the clock generator are halted, however, a command issued by the CPU employed in the host computer can no longer be received. In consequence, in accordance with the device's own judgment, the device is not capable of transiting to a sleep mode in which the supplying of power to the ATA/ATAPI command data interface of the device, the supplying of power to the clock generator and the supplying power to other components are halted. As a result, a command issued by the CPU employed in the host computer can only halt the motor so that there is raised a problem of an inability to reduce power adequately.

In addition, assume for example that a CPU employed in the device halts the supplying of power to the ATA/ATAPI command data interface in accordance with the CPU's own judgment, entering a sleep mode. In this case, even though the power consumption can be reduced, in the sleep mode, a command issued by the CPU employed in the host computer cannot be received. As a result, there is raised a problem that it is impossible to restore the device from the sleep mode to the normal state.

DISCLOSURE OF INVENTION

It is thus an object of the present invention addressing the problems described above to provide a device connected to a central processing unit employed in a host computer through the ATA/ATAPI bus with a capability of entering a sleep mode in accordance with the device's own judgment and returning to an original state in accordance with a hardware reset signal received from the central processing unit employed in the host computer.

An information processing apparatus provided by the present invention is characterized in that the information processing apparatus comprises: a state control unit for controlling the operation of the information processing apparatus to transit to a half halted state when no data is exchanged with a host computer through an ATA or ATAPI bus for at least a predetermined period of time; an interface processing unit for carrying out interface processing on a signal exchanged with the host computer through the ATA or ATAPI bus; and a reset signal supply means for passing on a received reset signal output by the host computer to make a request for termination of the half halted state to the state control unit directly from the ATA or ATAPI bus without passing through the interface processing unit when the state control unit controls the operation of the information processing apparatus to transit to the half halted state, wherein the state control unit restores the operation of the information processing apparatus from the half halted state to a normal state in accordance with the reset signal.

The information processing apparatus can be further provided with a clock generator for supplying a clock signal to the state control unit and the interface processing unit. When no data is exchanged with the host computer through the ATA or ATAPI bus for at least a predetermined period of time, the state control unit can drive the clock generator to supply a clock signal having a frequency lower than that of the normal clock signal only to the state control unit itself in order to control the operation of the information processing apparatus to transit to a half halted state.

The information processing apparatus can be further provided with a power supplying means for supplying power to the state control unit, the interface processing unit and the clock generator. When no data is exchanged with a CPU of the host computer through the ATA or ATAPI bus for at least a predetermined period of time, the state control unit can drive the clock generator to supply a clock signal having a frequency lower than that of the normal clock signal only to the state control unit itself, and can drive the power supplying means to supply power only to the state control unit itself and the clock generator in order to control the operation of the information processing apparatus to transit to a half halted state.

The reset signal may be implemented by a hardware reset signal conforming to ATA or ATAPI specifications.

The reset signal supply means can pass on a received hardware reset signal, which conforms to the ATA or ATAPI specifications and is output by the host computer to make a request for termination of the half halted state, as an IRQ signal to the state control unit directly from the ATA or ATAPI bus without passing through the interface processing unit when the state control unit controls the operation of the information processing apparatus to transit to a half halted state.

An information processing method provided by the present invention is characterized in that the information processing method including the reset signal supply step of passing on a received reset signal output by a host computer to make a request for termination of a half halted state to a state control unit directly from an ATA or ATAPI bus without passing through an interface processing unit when the state control unit controls a whole operation to transit to the half halted state, whereby the state control unit restores the operation of the information processing apparatus from the half halted state to a normal state in accordance with the reset signal.

In the information processing apparatus and the information processing method, which are provided by the present invention, the operation of the information processing apparatus is controlled to transit to a half halted state when no data is exchanged with a host computer through an ATA or ATAPI bus for at least a predetermined period of time; a signal exchanged with the host computer through the ATA or ATAPI bus is subjected to interface processing; a received reset signal output by the host computer to make a request for termination of the half halted state is passed on to a state control unit directly from the ATA or ATAPI bus without passing through an interface processing unit when the state control unit controls the operation of the information processing apparatus to transit to the half halted state; and the state control unit restores the operation of the information processing apparatus from the half halted state to a normal state in accordance with the reset signal.

BRIEF DESCRIPTION OF DRAWINGS

FIG. 2 is an explanatory diagram showing an ATAPI bus;

FIG. 3 shows a flowchart representing sleep mode control processing;

BEST MODE FOR CARRYING OUT THE INVENTION

Figure 1:
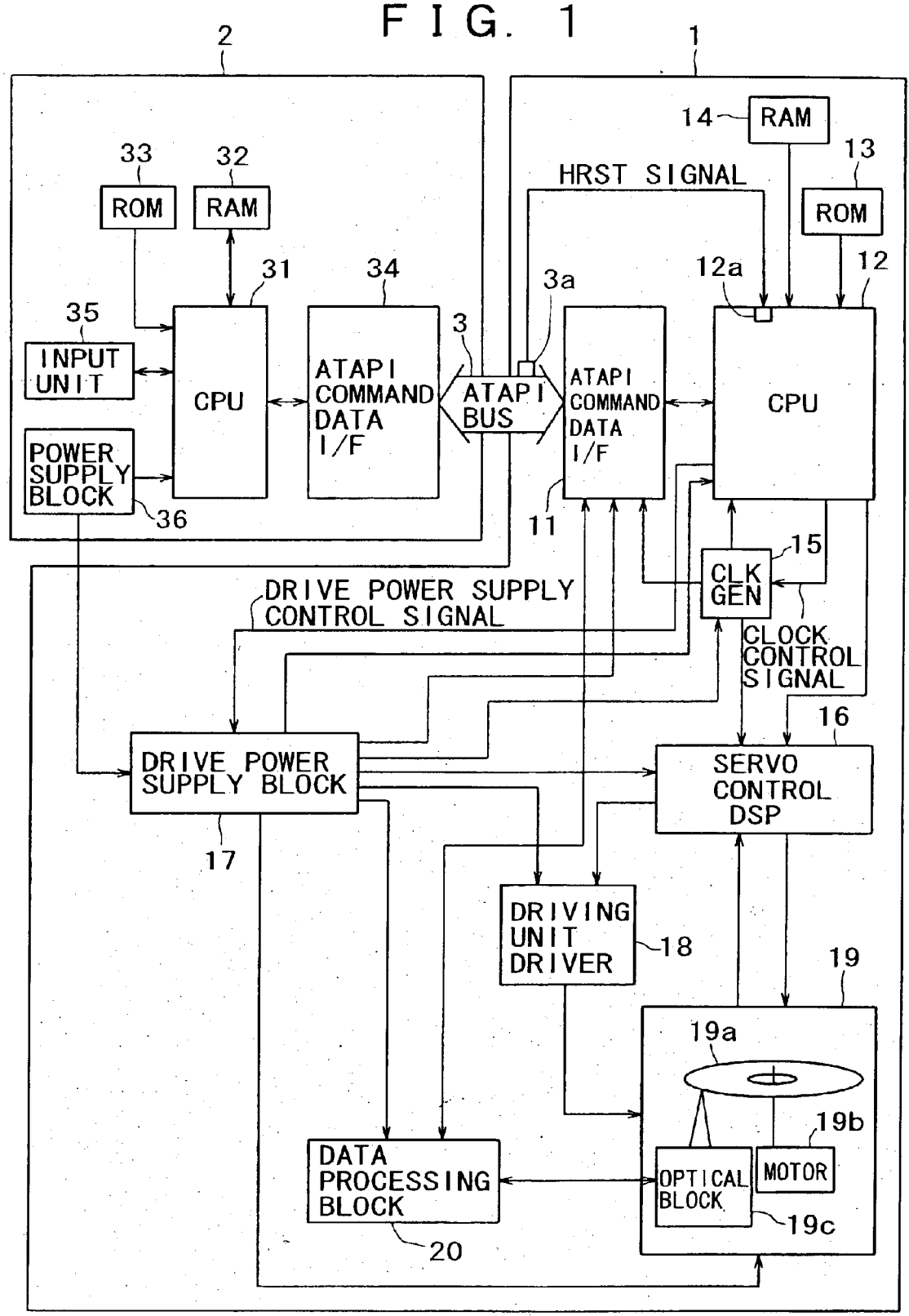
FIG. 1 is a block diagram showing a personal computer to which the present invention is applied.

FIG. 1 is a block diagram showing a personal computer to which the present invention is applied. An optical disc drive 1 is mounted on the personal computer. The optical disc drive 1 is controlled by a host computer 2 through an ATAPI bus 3. The host computer 2 controls the whole operation of the personal computer. On the basis of a command received from the host computer 2, the optical disc drive 1 reads out predetermined data recorded on an optical disc 19a and outputs the data to the host computer 2.

As described above, the host computer 2 controls the whole operation of the personal computer and the optical disc drive 1 connected to the host computer 2. The host computer 2 also controls the operation of any other device that can be connected to the ATAPI bus 3. The other device is not shown in the figure though. In the above description, the optical disc drive 1 is taken as an example of a device that can be connected to the host computer through the ATAPI bus 3. It is to be noted that such devices are not limited to the optical disc drive 1. The other device can be a CD-R (Compact Disc Recordable) drive, a CD-RW (Compact-Disc Re-writable) drive, a DVD (Digital Versatile Disc) drive or a hard disc drive.

In the optical disc drive 1, an ATAPI command data IF (Interface) 11 is controlled by a CPU 12 to function as an interface with the host computer 2 through the ATAPI bus 3. The ATAPI command data I/F 11 receives a variety of commands and data required by the commands from the host computer 2, supplying the commands and the data to the CPU 12. On the other hand, the ATAPI command data I/F 11 outputs data read out by an optical block 19c from the optical disc 19a and subjected to predetermined processing in a data processing block 20 to the host computer 2.

The CPU 12 controls the whole operation of the optical disc drive 1. The CPU 12 loads a program stored in a ROM 13 to a RAM properly to be executed in accordance with a result of interpretation of a command received from the host computer 2 through the ATAPI command data I/F 11. The CPU 12 also controls a servo control DSP (Digital Signal Processor) 15 to read out predetermined data from the optical disc 19a and supply the data to the host computer 2 by way of the ATAPI command data I/F 11.

If neither command nor data is exchanged with the host computer 2, that is, if the operation of the optical disc drive 1 is halted for at least a predetermined period of time, the CPU 12 puts the entire state of the optical disc drive 1 in a sleep mode. To put it concretely, the CPU 12 issues a drive power supply control signal for controlling a power supply block 17 to stop supplying power to the ATAPI command data I/F 11, a servo control DSP 16, a driving unit driver 18, a driving unit 19 and a data processing block 20. In addition, the CPU 12 outputs a clock control signal for controlling a clock generator (CLK GEN) 15 to output a clock signal having a frequency lower than that of the normal clock signal only to the CPU 12. When the CPU 12 receives a HRST (Hardware Reset) signal from a HRST signal extraction unit 3a of the ATAPI bus 3 in the sleep mode, the HRST signal is treated as an IRQ (Interrupt Request) signal generated by an IRQ signal reception unit 12a. Receiving the IRQ signal, the CPU 12 terminates the sleep mode. The IRQ signal is a signal requesting the CPU 12 to carry out interrupt processing. In this case, the IRQ signal is a signal requesting that the interrupt processing be carried out to terminate the sleep mode and restore the normal state.

The clock generator 15 generates a clock signal required for controlling the ATAPI command data I/F 11, the CPU 12 and the servo control DSP 16. On the basis of a command issued by the CPU 12, the servo control DSP 16 controls the servo of a motor 19b while monitoring the rotation of the motor 19b employed in the driving unit 19 by using the clock signal generated by the clock generator 15, and outputs control information to the driving unit driver 18.

On the basis of a drive power supply control signal received from the CPU 12, a drive power supply block 17 controls a power supplied by a power supply block 34 employed in the host computer 2, distributing the power to the ATAPI command data I/F 11, the CPU 12, the clock generator 15, the servo control DSP 16, the driving unit driver 17, the driving unit 19 and the data processing block 20. The driving unit driver 18 controls the optical block 19c of the driving unit 19 on the basis of servo information received from the servo control DSP 16.

The driving unit 19 is controlled by the servo control DSP 16 and the driving unit driver 18 to drive the optical block 19c to read out data from the optical disc 19a rotated by the motor 19b and output the data to the data processing block 20.

The data processing block 20 decompresses compressed data read out by the optical block 19c employed in the driving unit 19 from the optical disc 19a in accordance with a predetermined decompression technique, and outputs the decompressed data to the host computer 2 by way of the ATAPI command data I/F 11.

Next, the host computer 2 is explained.

A CPU 31 employed in the host computer 2 loads programs such as a BIOS (Basic Input Output System) stored in a ROM 33 into a RAM 32 properly for execution. In addition, when the user operates an input unit 35 comprising a keyboard and a mouse in order to control the optical disc drive 1, the CPU 31 controls an ATAPI command data I/F (interface) 34 to output a predetermined command to the CPU 12 employed in the optical disc drive 1 by way of the ATAPI bus 3 and the ATAPI command data I/F 11. In addition, while the optical disc drive 1 is in a sleeping mode, the CPU 31 outputs an HRST signal to the IRQ signal reception unit 12a of the CPU 12 by way of the ATAPI command data I/F 34, the ATAPI bus 3 and an HRST signal extraction unit 3a as an IRQ signal.

Next, details of the ATAPI bus 3 are explained by referring to FIG. 2.

The ATAPI bus 3 is a flat cable comprising typically 40, 44, 68 or 80 signal lines. Numbers are assigned to the signal lines in an ascending order starting with the signal line at the lowest part of the cable shown in the figure. The signal line at the lowest part of the cable corresponds to the first pin. In addition, the ATAPI bus 3 has one host connector 51 and two device connectors 52 and 53. The host connector 51 is connected to the ATAPI command data I/F 34 while the device connector 52 or 53 is connected to the ATAPI command data I/F 11. That is to say, the ATAPI bus 3 can be used to connect the host computer 2 to two devices. It is to be noted that, while FIG. 1 shows a case in which only one optical disc drive 1 is connected to the ATAPI bus 3 as a device, in actuality, another device can be further connected to the ATAPI bus 3.

In general, a hard disc drive not shown in the figure is connected to the ATAPI bus 3 in addition to the optical disc drive 1. The hard disc drive includes a stored basic program called an OS (Operating System) and stored software to be executed for carrying out various kinds of processing.

The device connectors 52 and 53 each have the HRST signal extraction unit 3a for extracting an HRST signal to be output to the IRQ signal reception unit 12a of the CPU 12. It is to be noted that, in order to distinguish the HRST signal extraction unit 3a provided on the device connector 52 from the HRST signal extraction unit 3a provided on the device connector 53, in the figure, the HRST signal extraction unit 3a provided on the device connector 52 and the HRST signal extraction unit 3a provided on the device connector 53 are denoted by reference numerals 3a-1 and 3a-2 respectively. In the following description, both the HRST signal extraction unit 3a provided on the device connector 52 and the HRST signal extraction unit 3a provided on the device connector 53 may be referred to as simply the HRST signal extraction unit 3a in case there is no need to distinguish the HRST signal extraction unit 3a provided on the device connector 52 and the HRST signal extraction unit 3a provided on the device connector 53 from each other. In the case of an ATAPI bus 3 having 40, 48 or 80 signal lines, the HRST signal extraction unit 3a extracts an HRST signal from the signal line connected to the $1^{st}$ pin of the host connector 51, the device connector 52 or the device connector 53. In the case of an ATAPI bus 3 having 68 signal lines, on the other hand, the HRST signal extraction unit 3a extracts an HRST signal from the signal line connected to the $58^{th}$ pin of the host connector 51, the device connector 52 or the device connector 53. The extracted HRST signal is supplied to the IRQ signal reception unit 12a of the CPU 12. It is to be noted that, since the HRST signal extracted by the HRST signal extraction unit 3a is used as a signal for requesting a restoration from a sleep mode, the HRST signal is not used in a mandatory manner. That is to say, in place of the HRST signal, a signal used dedicatedly for requesting a restoration from a sleep mode can be set and supplied to the IRQ signal reception unit 12a of the CPU 12. To put it concretely, in the case of an ATAPI bus 3 comprising 44 signal lines, for example, a signal used dedicatedly for requesting a restoration from a sleep mode can be transmitted through a line connected to a pin defined by the vendor to be extracted by an extraction unit having the same configuration as the HRST signal extraction unit 3a and to be output to the IRQ signal reception unit 12a of the CPU 12. The pin defined by the vendor can be one of pins A to D prescribed in ATA specifications. In the case of an ATAPI bus 3 comprising 68 signal lines, the $12^{th}$ to $15^{th}$, the $18^{th}$ to $26^{th}$, the $43^{rd}$, the $46^{th}$ to $50^{th}$, the $52^{nd}$ to $54^{th}$ and the $57^{th}$ signal lines are not used. Thus, a signal used dedicatedly for requesting a restoration from a sleep mode can be transmitted through one of these unused signal lines.

By referring to a flowchart shown in FIG. 3, the following description explains processing carried out by the optical disc drive 1 to control the sleeping mode.

Figure 4A:
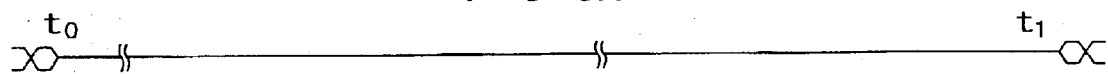
FIG. 4A shows a timing chart used for explaining sleep mode control processing.
Figure 4B:
FIG. 4B shows a timing chart used for explaining sleep mode control processing.
Figure 4C:
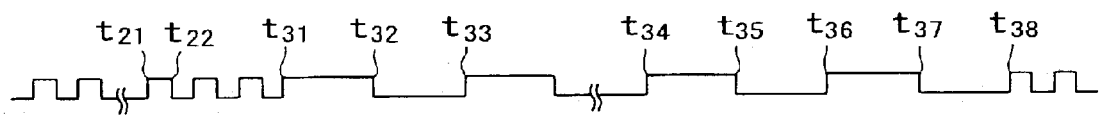
FIG. 4C shows a timing chart used for explaining sleep mode control processing.
Figure 4D:
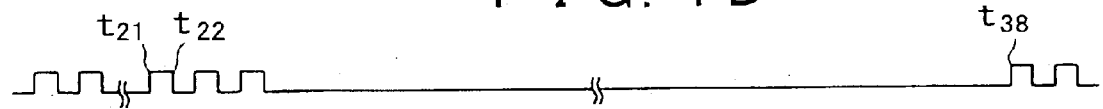
FIG. 4D shows a timing chart used for explaining sleep mode control processing.
Figure 4E:
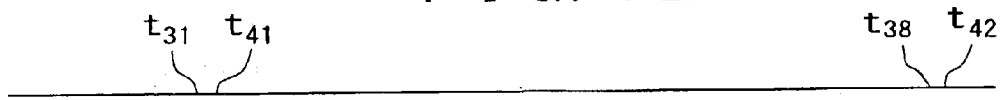
FIG. 4E shows a timing chart used for explaining sleep mode control processing.
Figure 4F:
FIG. 4F shows a timing chart used for explaining sleep mode control processing.

At a step S1, the CPU 12 forms a judgment as to whether or not a predetermined time has lapsed since termination of its own operation on the basis of a clock signal input from the clock generator 15. This judgment is formed repeatedly till the predetermined time lapses since termination of its own operation. Assume for example that processing to transmit data is ended at a time t0 shown in FIG. 4A. Then, a state in which no signals are transmitted is determined to have lapsed for a predetermined period of time, which is a period of time from t0 to t31 in this example. In this case, the flow of the processing goes on to a step S2. FIG. 4A shows a timing chart of data transmitted through the ATAPI command data I/F 11. FIG. 4B shows a timing chart of the HRST signal input from the HRST signal extraction unit 3a. FIG. 4C shows a timing chart of a clock signal output from the clock generator 15 to the CPU 12. FIG. 4D shows a timing chart of a clock signal output to components other than the CPU 12. FIG. 4E shows a timing chart of an on-off signal of powers supplied from the drive power supply block 17 to the CPU 12 and the clock generator 15. FIG. 4F shows a timing chart of an on-off signal of powers supplied from the drive power supply block 17 to components other than the CPU 12 and the clock generator 15.

At the step S2, in order to show a sleep mode, the CPU 12 outputs a clock control signal to the clock generator 15 and a drive power supply control signal to the drive power supply block 17 on the basis of a program stored in the ROM 13.

Then, at the next step S3, the clock generator 15 generates a special clock signal with a frequency lower than that of the normal clock signal, and outputs the special clock signal to only the CPU 12 in accordance with the clock control signal received from the CPU 12. To put it in detail, as shown in FIGS. 4C and 4D, till a sleep mode is started at a time t31, a clock signal with a pulse width equal to a sub-period between times t21 and t22 is output to all components. The clock signal has a period between times t21 and t23 wherein the sub-period between times t21 and t22 is equal to a sub-period between times t22 and t23. As the CPU 12 outputs a sleep mode command, the clock generator 15 outputs a clock signal with a period between times t31 and t33 to the CPU 12 as shown in FIG. 4C. As is obvious from the figure, the period between times t31 and t33 is longer than the period between the times t21 and t23. That is to say, the clock generator 15 outputs a clock signal with a low frequency to the CPU 12. In addition, the clock generator 15 stops supplying clock signals to components other than the CPU 12 as shown in FIG. 4D.

Subsequently, at the next step S4, the drive power supply block 17 stops supplying power to the CPU 12 and components other than the clock generator 15 in accordance with a drive power supply control signal received from the CPU 12. That is to say, the supplying of power to the CPU 12 and components other than the clock generator 15 is discontinued as shown in FIG. 4F. At that time, the supplying of power to the CPU 12 and the clock generator 15 is continued in the same way as the way in which power was supplied to them prior to the time t31 as shown in FIG. 4E. (The sleep node is started at the time t31.) Since the clock generator 15 needs to generate a clock signal at a lower frequency and output the clock signal only to the CPU 12, however, the amount of power supplied to the clock generator 15 decreases after the optical disc drive 1 enters the sleep mode at the time t41. By the same token, since the power consumption of the CPU 12 decreases due to the lower frequency of the clock signal received by the CPU 12 from the clock generator 15, the amount of power consumed by the CPU 12 is also reduced as well.

Then, at the next step S5, the CPU 12 forms a judgment as to whether or not the HRST signal has been supplied to the IRQ signal reception unit 12a, that is, whether or not a command requesting a restoration from the sleep mode has been received from the host computer 2. This judgment is formed repeatedly till the HRST signal is received. At the step S5, assume for example that the HRST signal was supplied from the CPU 31 employed in the host computer 2 to the IRQ signal reception unit 12a by way of the ATAPI command data I/F 34, the ATAPI bus 3 and the HRST signal extraction unit 3a as an IRQ signal during a period of time between t11 and t12 as shown in FIG. 4B. In this case, the outcome of the judgment formed at the step S5 causes the flow of the processing to go on to a step S6. Since the CPU 12 is operating on the basis of a special clock signal having a frequency lower than the frequency of the normal clock signal at that time as shown in FIG. 4C, a signal having a frequency even lower than the frequency of the special clock signal is required. That is to say, it is necessary to generate an HRST pulse signal with a pulse width longer than the period of the special clock signal, which is a period between times t34 and t36 (or a period between the times t31 and t33).

Then, at the next step S6, in order to terminate the sleep mode, the CPU 12 outputs a clock control signal to the clock generator 15 and a drive power supply control signal to the drive power supply block 17.

Subsequently, at the next step S7, the clock generator 15 outputs the normal clock signal after a time t38 shown in FIG. 4C to the CPU 12 and to components other than the CPU 12 as shown in FIG. 4D in accordance with the clock control signal received from the CPU 12.

Then, at the next step S8, the drive power supply block 17 resumes the supplying of power to all components including the CPU 12 and the clock generator 15 after a time t42 shown in FIG. 4F in accordance with the drive power supply control signal output by the CPU 12 to terminate the sleep mode. Subsequently, the flow of the processing goes back to the step S1 to repeat the operations of this step and the subsequent steps.

To put it in detail, the pieces of processing carried out at the steps S2 and S3 put the ATAPI command data I/F 11 in a state of being unable to exchange data with the CPU 31 employed in the host computer 2 through the ATAPI bus 3 because no power is received from the drive power supply block 17 as shown in FIG. 4F. At that time, in the optical disc drive 1, no power is supplied to all components except the CPU 12 and the clock generator 15. In addition, since the clock generator 15 outputs a special clock signal with a frequency lower than that of the normal clock signal to the CPU 12, the power consumption is reduced to result in a power saving state. Moreover, since the CPU 12 receives the special clock signal with a frequency lower than that of the normal clock signal from the clock generator 15, only a minimum amount of processing can be carried out so that the power consumption decreases.

Furthermore, even in a sleep mode, the CPU 12 is capable of receiving only the HRST signal, which comes from the ATAPI bus 3 by way of the TRQ signal reception unit 12a, bypassing the ATAPI command data I/F 11. Thus, the CPU 12 is capable of terminating the sleep mode of the optical disc drive 1 in accordance with a command issued by the CPU 31 employed in the host computer 2.

In addition, as described above, it is also possible to similarly control a hard disc drive connected to the ATAPI bus 3 besides the optical disc drive 1. It is to be noted, however, that the hard disc drive itself is not shown in the figure.

Moreover, even though an ATAPI bus 3 as well as ATAPI command data I/Fs 11 and 34 are employed as described above, it is needless to say that an ATA bus as well as ATA command data interfaces can also be used as well.

As described above, a device connected to a host computer by an ATA bus and ATA interfaces or an ATAPI bus and ATAPI interfaces enters a sleep mode (a half halted state) in accordance with the device's own judgment and is capable of returning to a normal state as requested by a hardware reset signal received from the CPU 31 employed in the host computer 2.

INDUSTRIAL APPLICABILITY

In accordance with the present invention, a device enters a half halted state in accordance with the device's own judgment and is capable of returning to a normal state as requested by a hardware reset signal received from a host computer.

What is claimed is:

1. An information processing apparatus connected with a host computer through an ATA or ATAPI bus characterized in that said information processing apparatus comprises:
   a state control unit for controlling the operation of said information processing apparatus;
   an interface processing unit for carrying out interface processing on a signal exchanged with said host computer through said ATA or ATAPI bus;
   a clock generator for supplying a clock signal to said state control unit and said interface processing unit;
   a power supplying means for supplying power to said state control unit, said interface processing unit and said clock generator, wherein when no data is exchanged with said host computer through said ATA or ATAPI bus for at least a predetermined period of time, said state control unit drives said clock generator to supply a clock signal having a frequency lower than that of a normal clock signal only to said state control unit itself, and drives said power supplying means to supply power only to said state control unit itself and said clock generator in order to control the operation of said information processing apparatus to transit to a half halted state; and
   a reset signal supply means for passing on a received reset signal output by said host computer to make a request for termination of said half halted state to said state control unit directly from said ATA or ATAPI bus without passing through said interface processing unit when said state control unit controls the operation of said information processing apparatus to transit to said half halted state,
   wherein said state control unit restores the operation of said information processing apparatus from said half halted state to a normal state in accordance with said reset signal.

2. An information processing apparatus according to claim 1, said information processing apparatus characterized in that said reset signal is a hardware reset signal conforming to ATA or ATAPI specifications.

3. An information processing apparatus according to claim 2, said information processing apparatus characterized in that said reset signal supply means passes on a received hardware reset signal, which conforms to said ATA or ATAPI specifications and is output by said host computer to make a request for termination of said half halted state, as an IRQ signal to said state control unit directly from said ATA or ATAPI bus without passing through said interface processing unit when said state control unit controls the operation of said information processing apparatus to transit to a half halted state.

4. An information processing method adopted by an information processing apparatus comprising a state control unit for controlling the operation of said information processing apparatus, an interface processing unit for carrying out interface processing on a signal exchanged with said host computer through said ATA or ATAPI bus, a clock generator for supplying a clock signal to said state control unit and said interface processing unit, and a power supplying means for supplying power to said state control unit, said interface processing unit and said clock generator, wherein when no data is exchanged with said host computer through said ATA or ATAPI bus for at least a predetermined period of time, said state control unit drives said clock generator to supply a clock signal having a frequency lower than that of a normal clock signal only to said state control unit itself, and drives said power supplying means to supply power only to said state control unit itself and said clock generator in order to control the operation of said information processing apparatus to transit to a half halted state; said information processing method characterized by including the step of passing on a received reset signal output by said host computer to make a request for termination of said half halted state to said state control unit directly from said ATA or ATAPI bus without passing through said interface processing unit when said state control unit controls a whole operation to transit to said half halted state, whereby said state control unit restores the operation of said information processing apparatus from said half halted state to a normal state in accordance with said reset signal.

* * * * *